Figure 3:
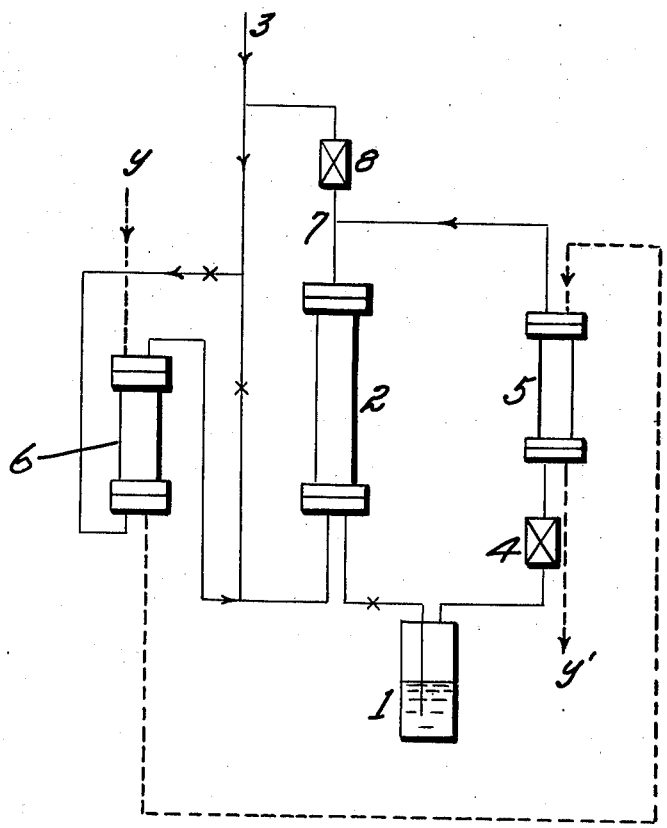

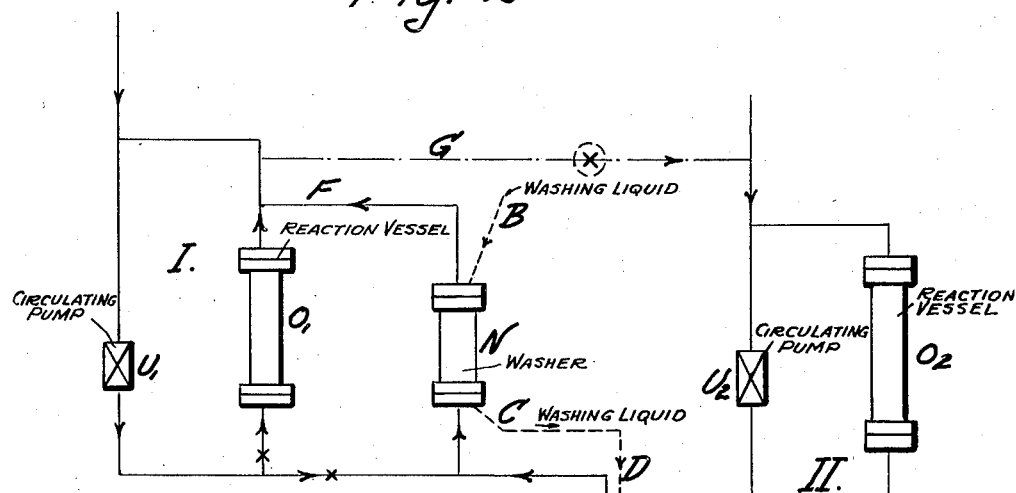
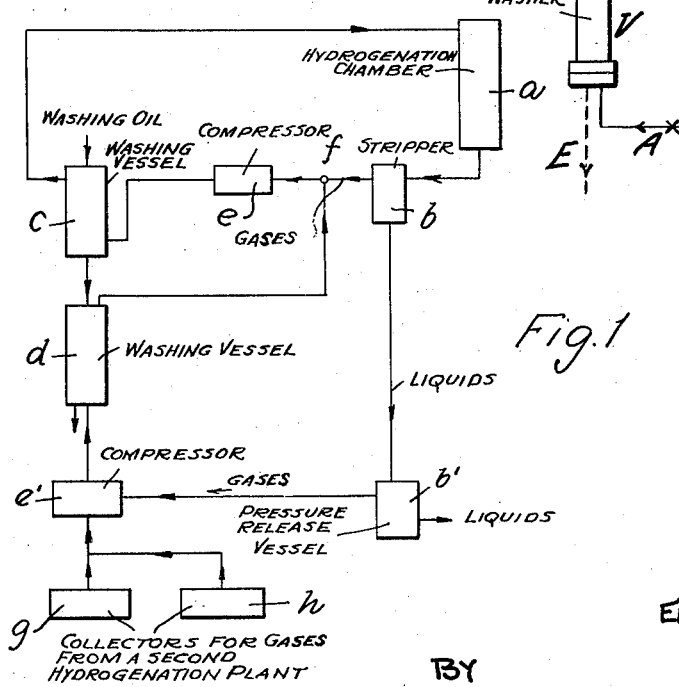

Oct. 23, 1934.    E. HOCHSCHWENDER ET AL    1,977,992
RECOVERY OF HYDROGEN FROM GASES CONTAINING HYDROGEN AND HYDROCARBONS
Filed Feb. 20, 1932    2 Sheets-Sheet 2

INVENTORS
ERNST HOCHSCHWENDER.
MAX JOSENHANS.

BY Hauff & Barland
ATTORNEYS.

Patented Oct. 23, 1934

1,977,992

UNITED STATES PATENT OFFICE 1,977,992

RECOVERY OF HYDROGEN FROM GASES CONTAINING HYDROGEN AND HYDROCARBONS

Ernst Hochschwender and Max Josenhaus, Leuna, Germany, assignors, by mesne assignments, to Standard-I. G. Company, Linden, N. J., a corporation of Delaware Application February 20, 1932, Serial No. 594,172
In Germany February 24, 1931

4 Claims. (Cl. 196—53)

The present invention relates to improvements in and apparatus for the recovery of hydrogen from gases containing hydrogen and hydrocarbons.

We have found that in the recovery of hydrogen from various gases containing hydrogen and hydrocarbon gas (by which expression for the purpose of the present invention we understand also hydrocarbon vapors present in a gas maintained under normal conditions) which gases derived from different or the same sources and having different hydrocarbon contents it is advantageous to bring the gas having the higher hydrocarbon content to a lower concentration, preferably to the hydrocarbon content of the gas having a low hydrocarbon concentration, by washing the gas with a solvent for the said hydrocarbons in such a manner that at least part thereof is dissolved, the two gases then being subjected together to a subsequent washing, if desired under different conditions. The washing of the gas having the higher concentration in hydrocarbons is preferably brought approximately to the concentration in hydrocarbons of the initial gas which is poorer in hydrocarbons.

The process according to the present invention is especially applicable in the working up of the gases obtained by the destructive hydrogenation of coals, distillable carbonaceous materials, such as tars, mineral oils and the like, for example with a view to employ the hydrogen contained therein again in this process. In this case the procedure may be as follows:

The gases and very readily volatile hydrocarbons dissolved in the liquid products from destructive hydrogenation (which is carried out at temperatures ranging from 300° to 700° C. and under elevated pressures of at least 20 atmospheres, preferably between 100 and 300 atmospheres) are set free by fractionally releasing the pressure on the liquid products (benzine, middle oils and the like). The gases obtained by releasing the pressure down to for example 25 atmospheres are rich in hydrogen while those obtained from 25 atmospheres down to from 1 to 3 atmospheres are poor in hydrogen and therefore hardly come into question for the recovery of hydrogen. The hydrogen contained in the gas obtained down to 25 atmospheres is supplied again to the circulating hydrogenating gas in the following manner. Since this gas is richer in hydrocarbons than the unwashed circulating gas, the gas obtained by releasing the pressure to 25 atmospheres is subjected according to the present invention, preferably after separating the constituents which are capable of being separated by condensation, to a special washing treatment, in such a manner that it is brought approximately to the neighbourhood of the hydrocarbon concentration of the unwashed circulating gas; it is then mixed with said circulating gas and both gases are further washed together until they attain the degree of purity desirable for further employment. The bringing to the reaction pressure of the gas, obtained by releasing the pressure, which gas has been washed prior to mixing it with the circulating gas, may also be dispensed with. In this case the mixture of the washed gases being at a pressure somewhat lower than the reaction pressure is brought to this pressure prior to supplying it again to the destructive hydrogenation. The pressure of the gas obtained by releasing the pressure may also be raised to about reaction pressure prior to the first washing treatment.

It is preferable to employ the washing oil arising from this subsequent washing, which can still absorb hydrocarbons, for the previous washing of the gas obtained by releasing the pressure and which is to be returned in circulation.

The two washings may be carried out in a single washing apparatus or in separate apparatus for the previous washing and the subsequent washing. When a single washer is employed, the circulating gas is supplied at the place at which the gas obtained by releasing the pressure has the necessary hydrocarbon concentration. This place may be variable, and its position for a given amount of hydrocarbons is dependent on the degree of efficiency of the previous washing which in turn depends on the amount and on the temperature of washing oil employed and on the pressure resting thereon. When separate apparatus are used for the previous and subsequent washings, the same or different pressures may be employed therein. In the former case, the washing oil may flow, for example, from one washer to another washer arranged below it. The first washer and the washer for the circulating gas may also be arranged side by side. The first washer may then be under a higher pressure than the washer for the circulating gas. In this case the oil must sometimes be pumped from the washer for the circulating gas into the first washer. In cases when the employment of a pump offers difficulty, the pressure in the first washer may be chosen lower than that in the washer for the circulating gas so that the washing oil is conveyed from the lower end of the washer for the circulating gas to the upper end of the first washer by this difference in pressure. In this case the gas from the first washer must be brought to the pressure of the washer for the circulating gas by a pump. In order to overcome this difference in pressure, the usual gas circulating pumps may be employed. In this case the pressure of the previous washing is regulated so that it corresponds to the pressure on the suction side of the gas circulating pump. In this manner the provision of a special gas or oil pump is dispensed with.

As washing liquids may be employed any suitable solvents dissolving hydrocarbon gases, preferably washing oils of the nature of destructive hydrogenation products, for example those boiling between 180° and 220° C., or similar hydrocarbon fractions, such as those obtainable from mineral oils, as for example fractions from gas oil or illuminating oil, synthetic products, such as the higher fractions of the products obtained by interaction of hydrogen and carbon monoxide, or toluene or tetrahydronaphthalene.

Towers provided with filling bodies or with cups or with sieve insertions may be employed as the washing towers.

The nature of the invention will be further described with reference to the accompanying drawings which illustrate diagrammatically an arrangement of apparatus according to this invention, but the invention is not restricted to the particular arrangement shown.

Figure 1 of these drawings represents in a diagrammatic manner a plant in which the gases issuing from the destructive hydrogenation of carbonaceous materials may be freed from hydrocarbons according to the present invention.

The gaseous and vaporous products leaving a destructive hydrogenation chamber $a$ in which brown coal tar is converted into middle oil and benzine in the liquid phase under a pressure of 200 atmospheres in the presence of hydrogen are freed from condensable constituents in a stripper $b$. The effluent gases and vapors, after compression to 225 atmospheres in a compressor $e$, are led into a washer $c$ (circulating gas washer) and therein washed with a washing oil, as for example a middle oil produced in the process, which is flowing in counter-current. The washed gases are returned to the destructive hydrogenation chamber $a$. The liquid products obtained in the stripper $b$ are released from pressure in $b'$. The gas rich in hydrocarbons thus obtained which has a hydrocarbon content higher than that of the first-mentioned gases is compressed to 200 atmospheres in a compressor $e'$ and led into the washer $d$ (first washer) in which the oil flowing from $c$ which is not yet saturated in hydrocarbons is used as the washing oil. The gases washed out are introduced into the cycle of hydrogenating gas at $f$ on the suction side of the compressor $e$ and are subjected to a subsequent washing in the washer $c$ together with the gases issuing from stripper $b$. In strippers $b$ and $b'$ cooling agents having a temperature between about 5° and 25° C. are employed. In $b$ a pressure of 200 atmospheres is maintained, in $b'$ a pressure of only 25 atmospheres. As washing oil may be employed a destructive hydrogenation product boiling between 150° and 250° C. This washing oil is kept at a temperature of about from 5° to 25° C.

The middle oil obtained in the hydrogenation chamber $a$ is subjected to destructive hydrogenation in a further chamber (not shown) and converted into benzine. The waste gas containing hydrocarbons obtained by releasing the pressure on the benzine thus obtained, together with the gases set free by releasing the pressure on the washing oil in this process are preferably washed in the cyclic process already described with the gas obtained by releasing the pressure in the tar treatment. These gases are collected at $g$ (gas obtained by releasing the pressure on the benzine) and $h$ (gas obtained by releasing the pressure on the washing oil from the production of benzine) and supplied to the compressor $e'$ together with the gases obtained by releasing the pressure in $b$.

The following examples will further illustrate the nature of this invention but the invention is not restricted to these examples.

*Example 1*

If a washing oil with which the circulating gases in a destructive hydrogenation have been washed under increased pressure is released from pressure down to 25 atmospheres, a gas is obtained containing about 65 per cent of hydrogen and 35 per cent of hydrocarbons. This gas is compressed to a pressure of 200 atmospheres and then washed in counter-current with a washing oil which has already been used for another washing operation as hereinafter described. As washing oil may be employed, for example a hydrocarbon mixture boiling between 150° and 250° C. which is obtained from the destructive hydrogenation of carbonaceous materials. The washing oil has a temperature of about from 5° to 25° C. and is kept for about 3 minutes in contact with the treated gas. In this manner a gas is obtained containing 90 per cent of hydrogen and about 10 per cent of hydrocarbons, mainly methane. This gas is combined with the circulating gases from the destructive hydrogenation which contain about 10 per cent of hydrocarbons, mainly methane, on the suction side of the circulating pump which moves the circulating gases. This gas is then compressed to about 225 atmospheres and treated at this pressure in a second washer with a fresh washing oil which is subsequently used for the washing hereinbefore described and which is obtained by distillation or other method of regeneration from washing oils which have already been used or from destructive hydrogenation products of different kinds or from crude oils or tars and the like, and which may be specially selected for special purposes, as for example for a simultaneous desulphurization. For example a heavy benzine having a boiling point range of from 150° to 200° C. may be employed. By the said washings, practically all the readily volatile hydrocarbons formed during the destructive hydrogenation, in so far as they are not removed by the withdrawn liquid product, are continuously washed out to such an extent that a gas of constant composition and having a high content of hydrogen is returned to circulation.

The gas first produced having the higher hydrocarbon concentration may also have other contents of hydrocarbons according to the working conditions, as for example contents of about 25 or about 40 per cent of hydrocarbons.

*Example 2*

This example is with reference to Figure 2 showing somewhat diagrammatically a plant in which the gases from the synthesis of ammonia may be freed from hydrocarbons. If in the synthesis of ammonia an initial gas mixture is employed which contains about 0.3 per cent by volume of methane the circulating unconverted gases will soon become enriched in methane. In order not to surpass a concentration of methane say of 12 per cent a part of the circulating gas is branched off and employed in a second reaction vessel in which the methane is present in a higher concentration the yield in ammonia obtained in this vessel being correspondingly smaller.

Referring to the said Figure 2 in detail $O_1$ denotes the reaction vessel, $U_1$ the circulating pump for the first circulating system (indicated by I) for the preparation of ammonia, $O_2$ and $U_2$ the corresponding devices in the second circulating system II. From the said system II part of the circulating gases is branched off and passed by way of pipe A through the preliminary washer V in which the concentration of the methane present in the gases is reduced from 30 to 12 per cent by volume. The gases thus treated are combined with part of the gas coming from pump $U_1$ and which contains about 12 per cent of methane and are washed together in the washer N so that their content of hydrocarbons is reduced to about 2 per cent. The washing treatment is effected in vessel N and V with the same washing liquid supplied at B, removed from N at C, introduced into V at D and withdrawn therefrom at E. The gases washed in N are supplied to the circulating system I by way of pipe F; part of these gases may also be supplied to pump $U_2$ as indicated by line G. In the above described manner a rapid and successful washing effect is secured accompanied by the consumption of only small amounts of washing liquid and by satisfactory yields in the production of ammonia.

Example 3

This example is with reference to Figure 3 showing in a somewhat diagrammatic manner another plant in which the gases from the synthesis of ammonia may be purified.

Referring to this figure in detail numeral 1 denotes a condenser in which liquid ammonia is condensed by cooling to low temperatures and expanding from 200 atmospheres down to 15 atmospheres the gases issuing from the synthesis of ammonia effected in vessel 2 from gases supplied at 3, containing about 0.3 per cent of methane as an impurity. The gas resulting from this expansion which contains about 20 per cent of methane is then compressed in compressor 4 to 200 atmospheres and washed in washer 5 with a washing oil which has been used for washing in washer 6 the circulating gas from said synthesis containing about 10 per cent of methane. The washed compressed gas which contains 10 per cent of methane is combined with the said circulating gases at the suction side 7 of the circulating pump 8 at which place said gases as above stated have also a concentration of 10 per cent of methane. Part of the combined gases is washed in washer 6 with fresh washing oil so that the content of methane in this part is reduced to about 5 per cent. The path of the washing oil is indicated by the dotted line $y$—$y'$.

What we claim is:

1. A process for the recovery of hydrogen from two gas mixtures containing the same together with different proportions of hydrocarbon gas and resulting from a chemical reaction employing hydrogen as a reacting constituent, which comprises removing part of the hydrocarbon gas from the gas mixture richer in hydrocarbon gas by washing with a solvent for hydrocarbon gas, combining the washed gas with the gas mixture having a lower content of hydrocarbon gas, washing the combined gases with a solvent for hydrocarbon gas and returning the resulting washed gas to the chemical reaction.

2. A process for the recovery of hydrogen from two gas mixtures containing the same together with different proportions of hydrocarbon gas and resulting from a chemical reaction employing hydrogen as a reacting constituent, which comprises removing the hydrocarbon gas from the gas mixture poorer in hydrocarbon gas by washing with a solvent for hydrocarbon gas, washing in a separate stage with the used solvent the gas mixture richer in hydrocarbon gas, thus removing therefrom part of the hydrocarbon gas, combining the second gas mixture reduced in the content in hydrocarbon gas with the said gas mixture poorer in hydrocarbon gas before the latter is washed and returning the resulting washed gas to the chemical reaction.

3. A process for the recovery of hydrogen from two gas mixtures containing the same together with different proportions of hydrocarbon gas, of which gas mixtures one is obtained by releasing at least partly the pressure from a condensate from the gases and vapours resulting from the destructive hydrogenation of a carbonaceous material, while the other is the uncondensed part of the said gases and vapours, which comprises washing the gas mixture obtained from the said condensate with a washing oil, at least part of the hydrocarbon gas thereby being removed therefrom, combining the washed gas mixture with the said uncondensed part of said gases and vapours, washing the combined gas mixtures with a washing oil, thereby removing at least part of the hydrocarbon gas contained therein, and recycling the washed combined gases to the said destructive hydrogenation.

4. A process for the recovery of hydrogen from two gas mixtures containing the same together with different proportions of hydrocarbon gas, of which gas mixtures one is obtained by releasing at least partly the pressure from a condensate from the gases and vapours resulting from the destructive hydrogenation of a carbonaceous material, while the other is the uncondensed part of the said gases and vapours, which comprises washing the said uncondensed part of the said gases and vapours with a washing oil, thereby recovering at least part of the hydrocarbon gas contained therein, then washing with the washing oil resulting from the said washing step the gas mixture obtained from the said condensate, combining the said washed gas mixture with the said uncondensed part of the said gases and vapours before the latter is washed and returning the washed combined gas mixtures to the said destructive hydrogenation.

ERNST HOCHSCHWENDER.
MAX JOSENHAUS.